(12) United States Patent
Suzuki

(10) Patent No.: US 8,169,545 B2
(45) Date of Patent: May 1, 2012

(54) DISPLAY CONTROL APPARATUS AND METHOD FOR SUPERIMPOSING AN OBJECT ON A MOVING IMAGE

(75) Inventor: Wataru Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 12/271,558

(22) Filed: Nov. 14, 2008

(65) Prior Publication Data

US 2009/0128702 A1    May 21, 2009

(30) Foreign Application Priority Data

Nov. 15, 2007    (JP) .................................. 2007-297194

(51) Int. Cl.
*H04N 9/74* (2006.01)

(52) U.S. Cl. ........................................................ 348/584

(58) Field of Classification Search .................. 348/586, 348/589, 584, 588, 590, 598, 600, 725; 345/629, 345/638, 640, 641; 382/284, 293, 298
See application file for complete search history.

(56) References Cited

U.S. PATENT DOCUMENTS

| | | | | |
|---|---|---|---|---|
| 5,682,437 A * | 10/1997 | Okino et al. | .................. | 382/100 |
| 5,684,891 A * | 11/1997 | Tanaka et al. | .................. | 382/178 |
| 6,636,220 B1 * | 10/2003 | Szeliski et al. | ................ | 345/475 |
| 7,230,653 B1 * | 6/2007 | Overton et al. | ................ | 348/584 |
| 7,409,106 B2 * | 8/2008 | Aiso | ............................. | 382/284 |
| 7,436,454 B2 * | 10/2008 | Yamaguchi et al. | ........ | 348/387.1 |
| 7,502,070 B2 * | 3/2009 | Yamaguchi et al. | ........ | 348/387.1 |
| 7,661,601 B2 * | 2/2010 | Takano et al. | ................. | 235/494 |
| 7,738,778 B2 * | 6/2010 | Agnihotri et al. | ............. | 386/231 |
| 7,852,410 B2 * | 12/2010 | Ishii et al. | ..................... | 348/586 |
| 2002/0196370 A1 * | 12/2002 | Dagtas et al. | ................. | 348/600 |

FOREIGN PATENT DOCUMENTS

| | | |
|---|---|---|
| JP | 4-182788 A | 6/1992 |
| JP | 5-114048 A | 5/1993 |
| JP | 5-120494 A | 5/1993 |
| JP | 2001-188525 A | 7/2001 |

* cited by examiner

*Primary Examiner* — Paulos Natnael
(74) *Attorney, Agent, or Firm* — Carter, DeLuca, Farrell & Schmidt LLP

(57) ABSTRACT

A display control apparatus for superimposing an object on a moving image composed of a plurality of frames and outputting the moving image with the object superimposed to a monitor, comprises: an acquiring unit configured to acquire a plurality of candidate regions as candidates for superimposing the object on each of the plurality of frames constituting the moving image; an analyzing unit configured to, in each of the plurality of candidate regions acquired by the acquiring unit, analyze each of the plurality of frames and acquire a parameter showing an importance of each of the plurality of frames in each of the plurality of candidate regions; a determining unit configured to determine a superimposing region for superimposing the object based on the parameters; and a superimposing unit configured to superimpose the object on the superimposing region determined by the determining unit.

10 Claims, 8 Drawing Sheets

FIG. 4

```
<svg width="400" height="300"           ~402
        xmlns="http://www.w3.org/2000/svg"
        xmlns:xlink="http://www.w3.org/1999/xlink">

<g transform="translate(0,0)">
        <ellipse cx="0" cy="0" rx="50" ry="20"/>   ~403
        <text fill="white" font-size="20" x="-20" y="7">
            Logo                                              } 404
        </text>
    </g>

</svg>
```

401

402

403

404

DISPLAY CONTROL APPARATUS AND METHOD FOR SUPERIMPOSING AN OBJECT ON A MOVING IMAGE

BACKGROUND OF THE INVENTION

1. Field of the Invention

The present invention relates to a display control apparatus, method, and a storage medium, in particular, to a technique for superimposing an object on an image.

2. Description of the Related Art

In TV receivers, there are known techniques for displaying in a superimposing manner display information such as the channel or volume in a predetermined position of a video image. In recent years, the digitization of television broadcasts has made it necessary to superimpose and display a variety of digital information beyond such display information on video.

In the field of computers such as personal computers, application techniques are known for continuously displaying information related to the time or weather forecast, etc. on the video image. With such application techniques, the position of information or objects displayed on the video image is typically fixed irrespective of the video image or can be changed by a user operation per object within a predetermined range.

However, in the case where the position of the overlaid object is fixed irrespective of the video image, the viewer may be obstructed from following what is going on in the video image if the object is overlaid on a portion of the video image where there is a lot of fast action or where the characters of a caption or the like are displayed. Also, in a configuration in which the position of an overlaid object can be changed by a user operation, the user is faced with the hassle of having to continually operate an operation unit such as a mouse or remote controller.

In contrast, a configuration is known in which the user preselects a specific object that he or she does not want to be overlaid with another object in moving image content, and a blank region that does not overlap the specific object is detected and an object to be inserted is superimposed/displayed in the detected blank region (Japanese Patent Application Laid-Open No. 2001-188525).

However, the configuration of Japanese Patent Application Laid-Open No. 2001-188525 cannot be applied to images that require real-time processing such as a television broadcast since the specific object in the content needs to be selected in advance. Even in the case of stored moving image content, there are many obstacles to acquiring precise outline information on an object with respect to images such as scenery, nature and so on, often making it impossible in reality for the user to preselect a specific object that he or she does not want to be overlaid with other objects.

SUMMARY OF THE INVENTION

An embodiment of the present invention has been made in consideration of the above problems, and has as its object to provide a technique that enables an object to be superimposed in a suitable position irrespective of the type of video image, without needing to preselect a specific object in content.

According to one aspect of the present invention, a display control apparatus for superimposing an object on a moving image composed of a plurality of frames and outputting the moving image with the object superimposed to a monitor, includes: an acquiring unit configured to acquire a plurality of candidate regions as candidates for superimposing the object on each of the plurality of frames constituting the moving image, an analyzing unit configured to, in each of the plurality of candidate regions acquired by the acquiring unit, analyze each of the plurality of frames and acquire a parameter showing an importance of the each of the plurality of frames in each of the plurality of candidate regions, a determining unit configured to determine a superimposing region for superimposing the object based on the parameters, and a superimposing unit configured to superimpose the object on the superimposing region determined by the determining unit.

According to another aspect of the present invention, a display control method of a display control apparatus for superimposing an object on a moving image composed of a plurality of frames and outputting the moving image with the object superimposed to a monitor, includes the steps of: acquiring a plurality of candidate regions as candidates for superimposing the object on each of the plurality of frames constituting the moving image, analyzing, in each of the plurality of candidate regions acquired by the acquiring unit, each of the plurality of frames and acquiring a parameter showing an importance each of the plurality of frames in each of the plurality of candidate regions, determining a superimposing region for superimposing the object based on the parameters; and superimposing the object in the superimposing region determined in the determining step.

Further features of the present invention will become apparent from the following description of exemplary embodiments with reference to the attached drawings.

BRIEF DESCRIPTION OF THE DRAWINGS

FIG. 4 illustrates a structured document defining an object.

DESCRIPTION OF THE EMBODIMENTS

Embodiments according to the present invention will now be described in detail with reference to the accompanying drawings. The constituent elements shown in the embodiments are, however, merely illustrative, and are not intended to limit the scope of the invention. Further, not all combinations of features described in the embodiments are essential to the means by which the present invention solves the above problems.

Embodiment 1

Hardware Configuration

Figure 1:
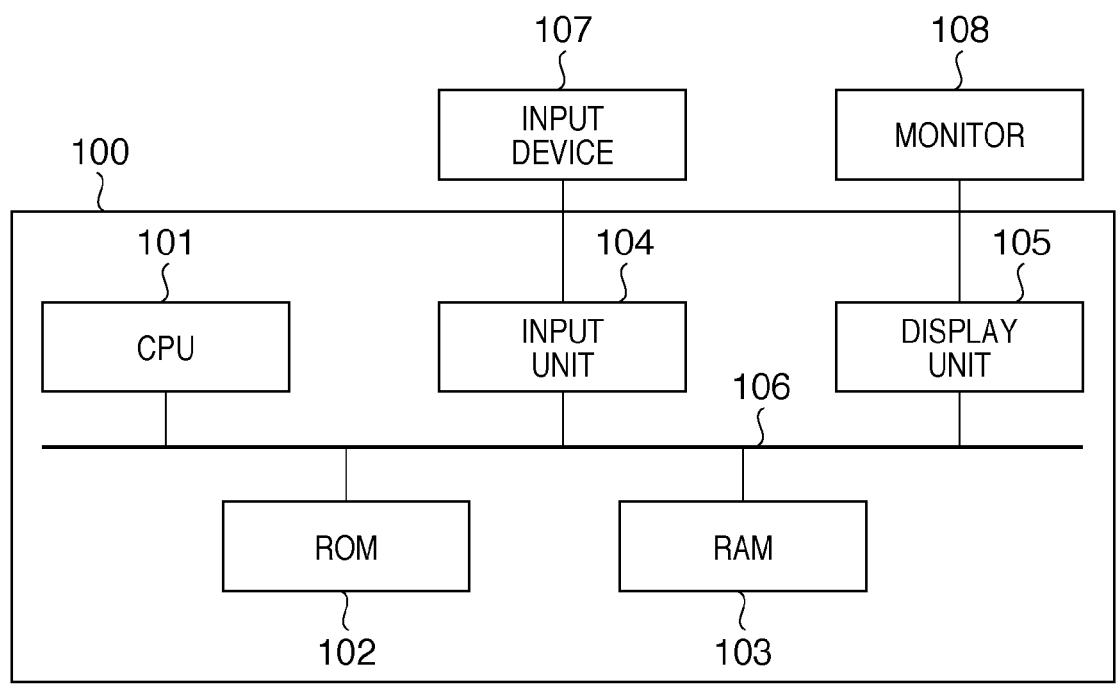
FIG. 1 is a block diagram showing the hardware configuration of a display control apparatus.

The hardware configuration of a display control apparatus 100 according to the present embodiment will be described with reference to FIG. 1. FIG. 1 is a block diagram showing the hardware configuration of the display control apparatus 100. The display control apparatus 100 is realized by a set-top box, but may be realized by another computer apparatus such as a personal computer (PC), a work station (WS), or a personal digital assistant (PDA), for example.

In FIG. 1, reference numeral 101 denotes a central processing unit (CPU) that performs overall control of the display control apparatus 100. Reference numeral 102 denotes a read-only memory (ROM) that stores computer programs and parameters that do not require changing. Reference numeral 103 denotes a random access memory (RAM) that temporarily stores computer programs and data supplied from an external device or the like.

Reference numeral 104 denotes an input unit constituting an interface with an input device 107. The input device 107 receives user operations and inputs data, and is realized by a remote controller or the like. The input device 107 may also be realized by a keyboard, a pointing device, or the like.

Reference numeral 105 denotes a display unit that functions as an interface with a monitor 108, with the display unit 105 displaying output images on the monitor 108. The monitor 108 is a display apparatus for displaying data held in or data supplied to the display control apparatus 100. In the present embodiment, the display apparatus of a TV receiver (not shown) is used as the monitor 108, although a dedicated display monitor 108 may be used. The monitor 108 is realized by a liquid crystal display panel, a cathode ray tube (CRT) display, an organic electroluminescent (EL) display, or a surface-conduction electron-emitter display (SED), for example. Reference numeral 106 denotes a system bus that communicably connects the respective units 101 to 105.

Note that the display control apparatus 100 may be provided with other hardware units such as an external storage device or a network interface. External storage devices include, for example, a fixedly installed hard disk or memory card, an optical disk such as a removable flexible disk (FD) or compact disk (CD), a magnetic or optical card, an IC card, a memory card, or the like. Network interfaces include, for example, a local area network (LAN) interface or wireless LAN interface for connecting to a network line such as the Internet.

In the present embodiment, a configuration in which the display control apparatus 100 according to the present embodiment is realized by a single device will be discussed for convenience of description, although the display control apparatus 100 may be realized by a configuration in which resources are distributed to a plurality of devices. For example, storage and calculation resources may be distributed to a plurality of devices. Alternatively, parallel processing may be performed, with resources being distributed for each constituent element realized virtually on the display control apparatus 100.

Functional Arrangement

Figure 2:
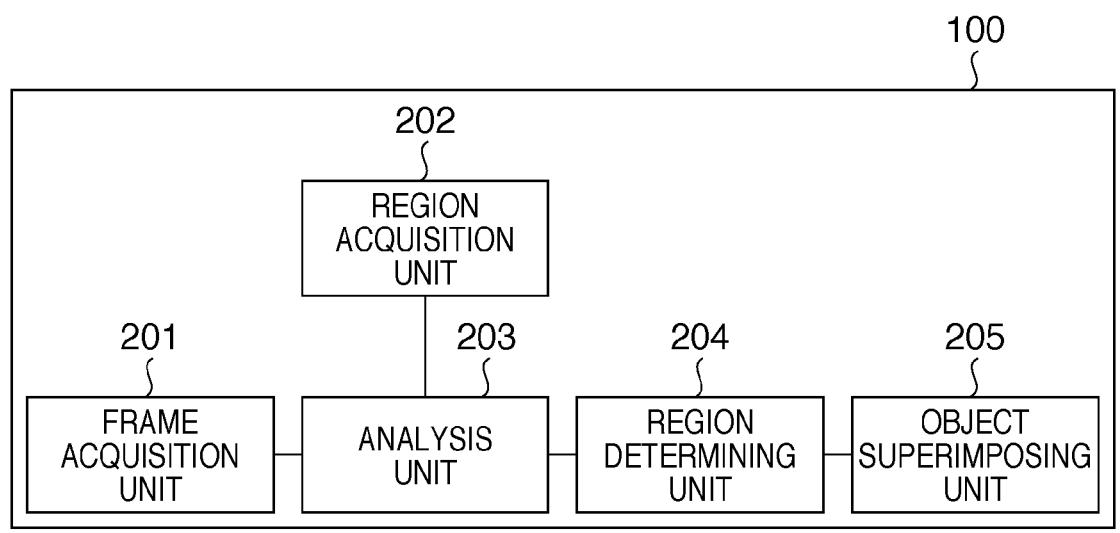
FIG. 2 is a block diagram showing a functional arrangement of the display control apparatus.

Next, a functional arrangement of the above display control apparatus 100 will be described with reference FIG. 2. FIG. 2 is a block diagram showing the functional arrangement of the display control apparatus 100 according to the present embodiment.

The functional blocks shown FIG. 2 are realized as a result of the CPU 101 of the display control apparatus 100 described above with reference to FIG. 1 executing a computer program loaded in the RAM 103, in coordination with the various hardware shown in FIG. 2. Some or all of the functional blocks may, of course, be realized by dedicated hardware.

The display control apparatus 100 according to the present embodiment is provided with the following functional blocks:

A region acquisition unit 201 that acquires at least one candidate region in which an object can be overlaid on a moving image (video).

A frame acquisition unit 202 that acquires frames at arbitrary times in the moving image.

An analysis unit 203 that performs moving image analysis on the candidate regions acquired by the region acquisition unit 201 in the frames acquired by the frame acquisition unit 202.

A region determining unit 204 that determines a current superimposing region in which to superimpose an object, based on the result of the analysis by the analysis unit 203.

An object superimposing unit 205 that superimposes an object in the superimposing region determined by the region determining unit 204, and outputs the moving image with the object superimposed.

Overall Processing

In the present embodiment, the moving image targeted for overlaying of object information such as graphics or characters is assumed to be a video image that requires processing in real-time such as television video. Incidentally, a video image that includes animation is also acceptable.

It is assumed that at the point at which the TV receiver is powered on and video display is commenced, an object is displayed in the upper right as an initial value, with the four corners of the display region of the video image defining a candidate region on which an object can be overlaid. Moving image analysis is continually performed on candidate regions on which to overlay an object for a fixed time period, and once the fixed period has elapsed, a superimposing region on which to overlay an object is determined from the analysis results during that period, and an object is output on the determined superimposing region. This processing is repeatedly performed while video is being output.

Figure 3:
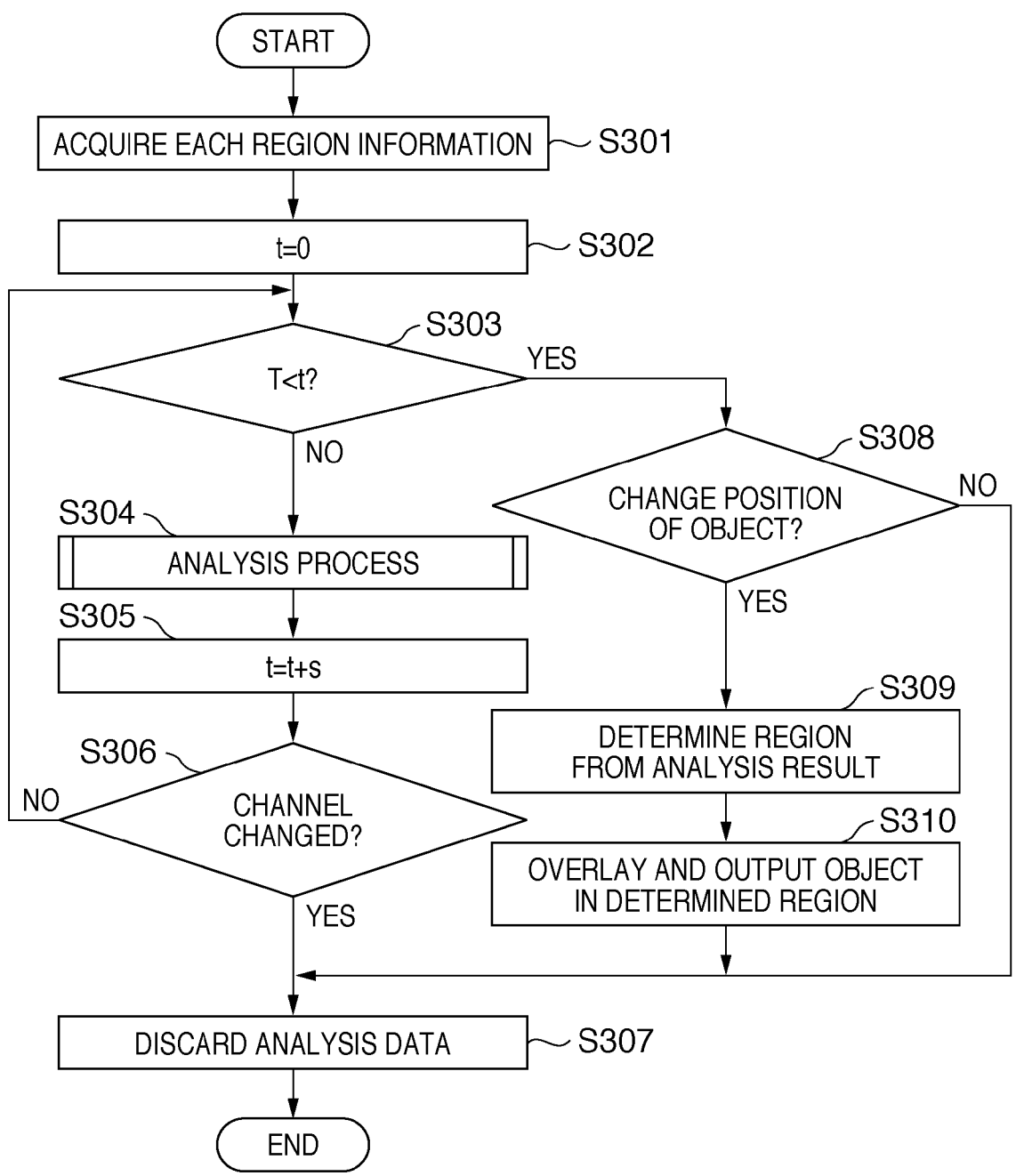
FIG. 3 is a flowchart showing the basic flow of overall processing.

FIG. 3 is a flowchart showing the basic flow of the processing that is repeated while video is being output. Hereinafter, the overall processing executed by the display control apparatus 100 will be described based on FIG. 3. Note that the processing shown in the steps of the flowchart are executed under the control of the CPU 101 of the display control apparatus 100.

In step S301, preset region information is acquired as a candidate region on which an object can be overlaid. Here, the region information includes the upper-left coordinates, width and height of a rectangle. The region information can be acquired by, for example, reading out a storage device (not shown) such as a hard disk device or by communicating with an external device.

Note that a candidate region on which an object can be overlaid may be designated in advance by the user. Designation of a candidate region on which an object can be overlaid is assumed to be performed using a pointing device such as a mouse or a touch pen, for example, although this is not limiting.

Next, an analysis time t is initialized to 0 in step S302.

Next, in step S303, the analysis time t is compared with a cycle T for determining a position of an object to be overlaid. If t exceeds T (step S303: YES), the processing moves to step S308, whereas if this is not the case (step S303: NO), step S304 is executed.

In step S304, an analysis process is performed on all of the at least one or more candidate regions acquired in step S301. Here, difference information between the frames in each candidate region or the frequency of appearance of characters in each candidate region is analyzed.

Generally, an object should not be superimposed on places that include content important to the moving image. A region in which there is a significant amount of image motion between frames, or a region in which characters are displayed often includes content important to the user being able to follow what is going on in the video image. In view of this, in the present embodiment, information related to the amount of motion in an image, the display time of characters, or the like is used as an importance parameter indicating the importance of frames, in order to determine a region in which to superimpose an object. In the analysis process, processing is performed on each candidate region to analyze the frames and acquire such importance parameters. The analysis process will be discussed in detailed below with reference to FIG. 7. The analysis process is performed at every interval s (s<T). Afterwards, the processing proceeds to step S305 where the analysis time t is incremented by the interval s.

Next, in step S306, it is determined whether the video channel has been changed by a user operation. This determination is performed based on whether the display control apparatus 100 has received a change signal indicating that the channel of the television broadcast has been changed. That is, if such a change signal has been received, it is determined that the video channel has been changed.

If the video channel has been changed (step S306: YES), the analysis data for the analysis time t is discarded in step S307 while leaving the display position of the object unchanged. This flow (steps S301 to S310) is repeated while video is being output on the display screen. While there is no change in channel (step S306: NO), the processing returns to step S303, and the processing of steps S303 to S306 is repeated until the condition of step S303 is satisfied.

If the condition T<t is satisfied in step S303, it is determined in step S308 whether to change the position in which the object is overlaid on the moving image, based on the analysis results at the analysis times 0 to t for each candidate region. For example, it is determined whether to change the position of the object by comparing importance parameters which are based on the amount of change in the moving image or the frequency of appearance of characters and indicate the importance of frames in the candidate regions, for the region in which an object has been overlaid to date and the other regions, until the cycle T elapses.

More specifically, in the case where, for example, a value showing an amount of image motion between frames is acquired as an importance parameter, the region with the smallest the amount of motion can be determined as the superimposing region. Alternatively, in the case where, for example, a time for which a value showing an amount of image motion between frames is at or above a prescribed threshold is acquired as an importance parameter, the region with the shortest time can be determined as the superimposing region. The time for which characters are displayed in a region is acquired as a parameter, and the region with the shortest display time can be determined as a superimposing region. If a superimposing region thus determined based on an importance parameter of some sort differs from the superimposing region when step S308 was executed, it is determined to change the position of the object.

If it is determined in step S308 not to change the position of the object (step S308: NO), the processing moves to step S307, and the analysis data for the analysis times 0 to t is discarded. This flowchart (steps S301 to S310) is repeated while video is being output on the display screen.

If it is determined to change the position of the object (step S308: YES), the processing proceeds to step S309. In step S309, a new superimposing region on which to overlay the object is determined based on the analysis results for the analysis times 0 to t. For example, a region with the least amount of change in the moving image or a region with the lowest frequency of appearance of characters is determined as the new superimposing region on which to overlay the object.

Next, in step S310, the object is output in a superimposing manner in the superimposing region determined at step S309. The processing then moves to step S307, and this flow (steps S301 to S310) is repeated while video is being output on the display screen.

Exemplary Display of an Object

Next, an object to be superimposed on a moving image and exemplary display thereof will be described with reference to FIGS. 4 to 6. Firstly, the definition of an object will be described with reference to FIG. 4. FIG. 4 illustrates a structured document defining an object.

Reference numeral 401 denotes a structured document in which an object to be overlaid on a moving image is represented in scalable vector graphics (SVG).

Reference numeral 402 defines the height and width of the object, with the width and height of the object being respectively 400 and 300 with the exemplary 402.

Reference numeral 403 shows the shape of the object. With the exemplary 403, cx="0" and cy="0" indicates that the coordinates of the center of the ellipse are (0, 0). rx="50" and ry="20" indicate that the radius of the ellipse in the x and y axial directions is 50 and 20, respectively.

Reference numeral 404 shows a character string constituting the object. With the exemplary 404, the sandwiching of the character string "Logo" between <text> tags indicates that the character string to be displayed is "Logo". fill="white" indicates that the characters are all white in color, and font-size="20" indicates that the size of the characters is 20. x="−20" and y="7" indicates that the positional coordinates of the character string are (−20, 7).

Note that while the case of the object being represented in SVG is illustrated in FIG. 4, the method of representing the object is arbitrary and not limited to this. Also, while graphics and a character string are given as exemplary object in FIG. 4, this is not limiting. For example, the object may be an image (still image, moving image), display of an application, or the like.

Next, a candidate region of a moving image on which an object can be superimposed will be described with reference to FIG. 5. FIG. 5 is a schematic view showing exemplary moving image content on which an object is to be superimposed.

Figure 5:
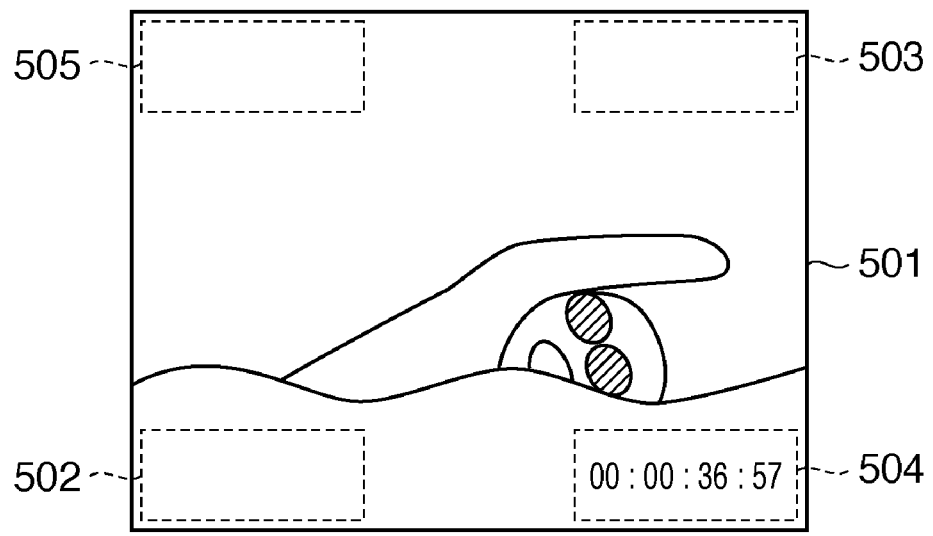
FIG. 5 is a schematic view showing exemplary moving image content on which an object is to be superimposed.
Figure 6:
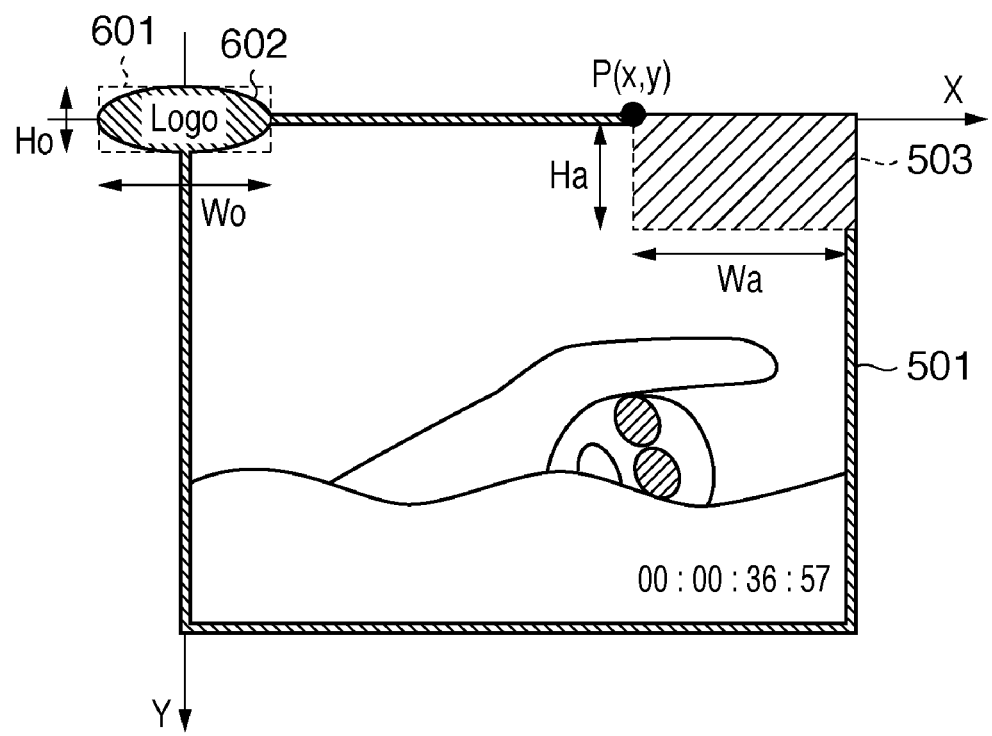
FIG. 6 illustrates a display result in the case where an object is rendered on a moving image.

In FIG. 5, reference numeral 501 represents the moving image to be overlaid with the object. The regions 502, 503, 504 and 505 represent candidate regions shown by the region information acquired in step S301 of FIG. 3. The display control apparatus 100 performs the analysis process on these regions of the moving image, and determines a superimposing region on which to overlay the object.

Note that in the present embodiment, the candidate regions acquired in step S301 are all the same size as the object to be overlaid, but this need not be the case. If not the same size, processing is added to change the size of the object to be overlaid.

Next, the appearance of an object superimposed and displayed on a moving image will be described with reference to FIG. 6. FIG. 6 illustrates a display result in the case where the structured document 401 was analyzed using structured document analysis, and the object was rendered on the moving image 501.

An object 602 is obtained by rendering the structured document 401. Firstly, the structured document 401 is described such that the center of a rectangle 601 encompassing the object 602 coincides with the upper left origin, as shown by 403 in FIG. 4.

In the present embodiment, an object is displayed in the upper right as an initial value. The object 602 is thus moved to the region 503. Further, in the case where the object 602 does not match the region 503 in size, processing is performed to appropriately vary the size of the object 602.

The region 503 positioned in the upper right of the moving image is determined in step S309. The description of the structured document 401 is changed such that the object 602 is moved parallel by (x+Wa/2, y+Ha/2), where (x, y) are the coordinates of an upper left point P of the region 503, Wa is the width, and Ha is the height. The center of the object 602 is thereby moved to the center of the region 503.

In the case where the size of the object 602 does not match the size of the region 503, the object 602 is made to match the region 503 by being made bigger or smaller. The width of the rectangle 601 is Wo, and the height is Ho. If Wa/Wo>Ha/Ho, then the description of the structured document 401 is changed so that the object 602 is moved parallel by (x+Wa/2, y+Ha/2), after the height and width thereof have respectively been varied by a factor of Ha/Ho. If this is not the case, then the description of the structured document 401 is changed so that the object 602 is moved parallel by (x+Wa/2, y+Ha/2), after the height and width thereof have respectively been varied by a factor of Wa/Wo.

The size of the object 602 is thus made to match the size of the region 503, although this is not limiting. For example, it is also possible to perform the process of varying the size of the object 602 only in the case where the object 602 does not fit within the region 503. That is, the object 602 is reduced in size so as to fit exactly within the region 503 if bigger than the region 503, but is not increased in size if smaller than the region 503.

When varying the size of the object 602, the ratio of height to width need not necessarily be maintained constant. For example, the size of the object 602 may be varied in accordance with the height to width ratio of the region 503.

Note that an exemplary configuration in which an object is superimposed after being transformed in accordance with the size of the superimposing region will be described in detail in embodiment 3.

Analysis Process

Figure 7:
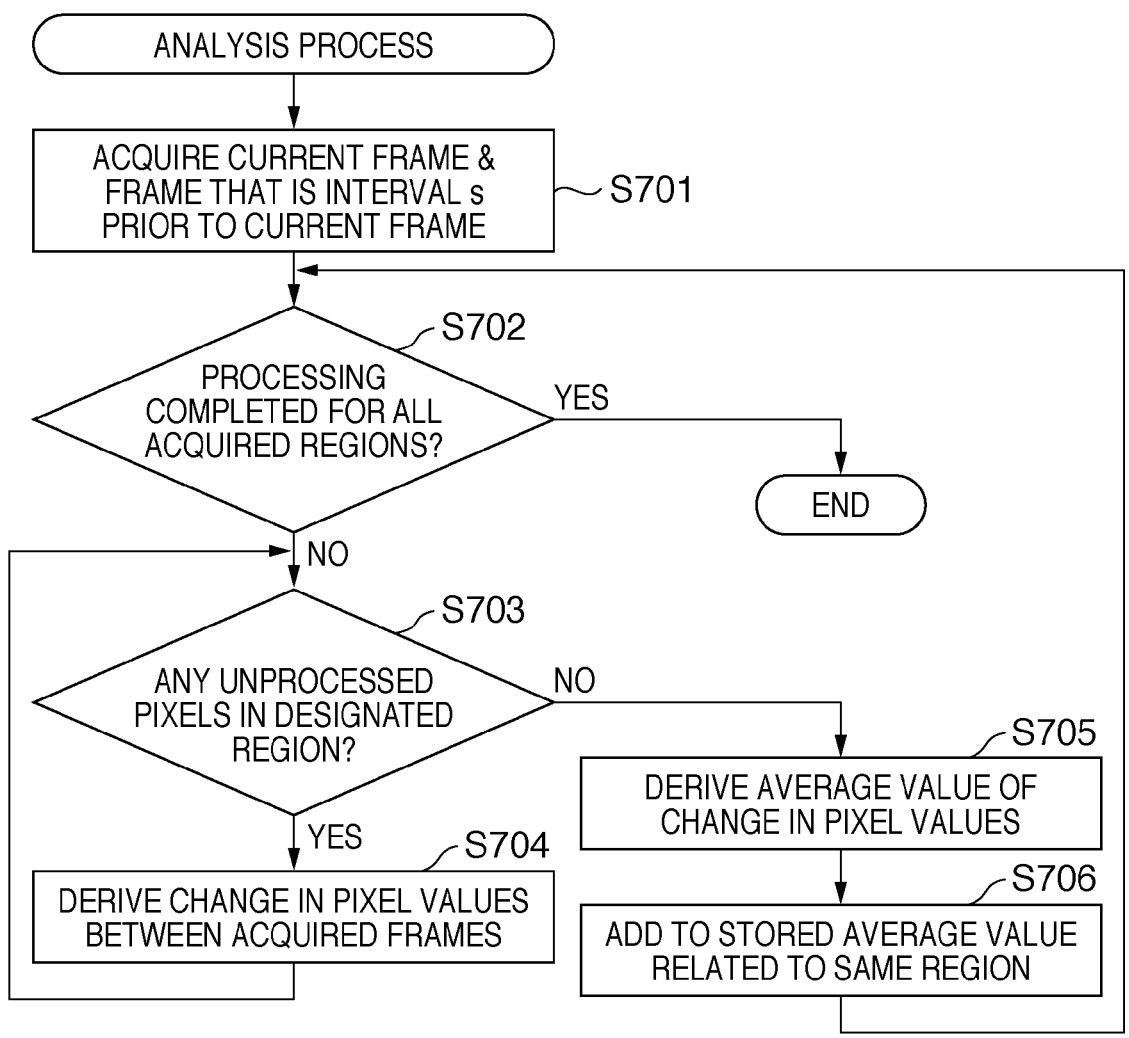
FIG. 7 is a flowchart showing an exemplary flow of an analysis process.

Next, the analysis process executed in step S304 of FIG. 3 will be described with reference to FIG. 7. FIG. 7 is a flowchart showing an exemplary flow of the analysis process. In the analysis process of the present embodiment, the frames of each region are analyzed, and a value showing the amount of image motion between frames is acquired as an importance vector. Note that in the present embodiment, the amount of motion is estimated based on the difference in pixel values between frames.

The pixel values constituting a frame are here constituted by 8-bit RGB information, and the upper-left coordinates, width and height of the candidate regions acquired in step S301 are given by (x, y), W, and H, respectively. Firstly, in step S701, the current frame of the moving image and a frame located a time interval s prior to the current frame are acquired.

Next, in step S702, it is determined whether processing has been completed for all of the candidate regions acquired in step S301. If it is determined to have been completed (step S702: YES), the processing is ended, whereas if it is determined not to have been completed (step S702: NO), the processing moves to step S703.

In step S703, it is determined whether there are any pixels that have not been analyzed in a single candidate region for which processing has still not been completed. If there are any unprocessed pixels (step S703: YES), the change (difference) in pixel values between the frames acquired in step S701 is derived in step S704. The inter-frame change N in pixel values at the same coordinates is given by:

$$N=\sqrt{(R-R')^2+(G-G')^2(B-B')^2}$$

Note that R, G and B are the values of the RGB components of a pixel in the current frame, while R', G' and B' are the values of the RGB components of the same pixel in a frame located the interval s prior to the current frame. This processing is repeated until the amount of change (difference) has been derived for all pixels in the designated candidate region.

If it is determined in step S703 that there are not any unprocessed pixels (step S703: NO), the average value of the change (difference) in pixel values is derived in step S705. This average value is here used as a parameter representing the amount of change in the current designated candidate region. A parameter B representing the change in pixel values is given by:

$$B=\frac{\sum_{i=x}^{x+W}\sum_{j=y}^{y+H}N[i][j]}{WH}$$

where N[i][j] is the change in pixel values at the coordinates (i, j) between the frames acquired in step S701.

Next, in step S706 the average value derived in step S705 is added to the average value related to the same candidate region that has already been stored, and the processing returns to step S702. The determination in step S308 as to whether to change the position of the object is based on the sum of the average values of each candidate region for the analysis times 0 to t stored in step S706. That is, this sum is used as an importance parameter. The greater this sum, the greater the change (difference) in pixel values in the candidate region. Note that in the case where the amount of change for all of the candidate regions is approximately the same, the flowchart of FIG. 3 is repeated without changing the position of the object.

In the present embodiment, as described above, frames are analyzed, in each candidate region, to acquire an importance parameter showing the importance of frames in the candidate region, and a superimposing region on which to superimpose an object is automatically determined based on these importance parameters. An object can thus be superimposed after determining a suitable superimposing position in real-time irrespective of the type of video, without needing to preselect a specific object in content.

Note that in the present embodiment, the amount of image motion between frames is estimated based on the difference in pixel values between frames, and a value showing the amount of motion is used as an importance parameter. An object can thus be displayed in an appropriate position while avoiding regions in which important content is displayed.

Embodiment 2

In embodiment 1, an example was described in which in the analysis process a value showing the amount of image motion between frames is acquired as an importance parameter. In the present embodiment, a further example will be described in which a time for which characters are displayed in a region is acquired as an importance parameter.

Since the hardware configuration and functional arrangement of the display control apparatus 100 of the present embodiment are similar to embodiment 1, description thereof will be omitted. In the present embodiment, the moving image targeted for overlaying of object information such as graphics or characters is assumed to be a video image that requires processing in real-time such as a television broadcast. Note that a video image that includes animation is also acceptable. While the four corners of a display region are presumed to define a region on which an object can be overlaid, the region is not required to be four-cornered when realized.

Analysis Process

In the present embodiment, moving image analysis is performed for a fixed period on candidate regions on which an object can be overlaid. Once the fixed period has elapsed, a superimposing region on which to overlay an object is determined from the analysis results during that period, and an object is output on the determined superimposing region. This processing is repeatedly performed while video is being output. The analysis method involves determining whether characters such as a caption, breaking news, the time or characters pre-embedded in moving image content are to be displayed in a designated candidate region, and setting the candidate region in which characters are displayed for the shortest time as a superimposing region on which to overlay an object.

Figure 8:
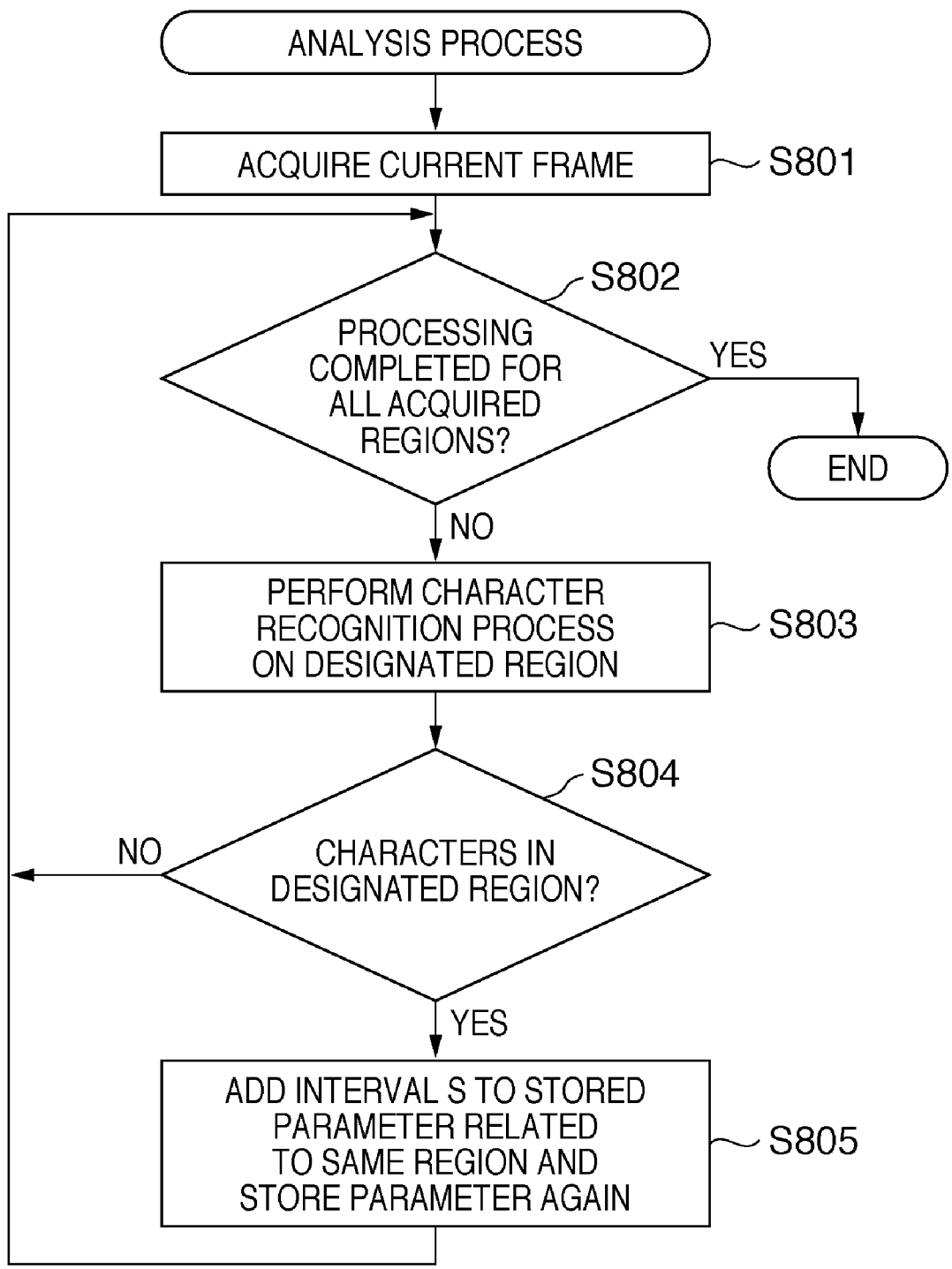
FIG. 8 is a flowchart showing an exemplary flow of an analysis process using character recognition.

FIG. 8 is a flowchart showing an exemplary flow of an analysis process using character recognition. Hereinafter, the flow of the analysis process executed at step S304 in FIG. 3 will be described in detail based on FIG. 8.

Firstly, in step S801, the current frame of the moving image is acquired. Next in step S802, it is determined whether processing has been completed for all of the candidate regions acquired in step S301. If completed (step S802: YES), the processing is ended, whereas if not completed (step S802: NO), the processing moves to step S803.

In step S803, character recognition is performed on a single candidate region for which processing has still not been completed. Note that processes for recognizing characters in an image are well known, and that a known recognition process can be applied. Character recognition processes are, for example, disclosed in Japanese Patent Application Laid-Open Nos. 4-182788, 5-114048, and 5-120494.

Next, it is determined in step S804 whether there are any characters in the candidate region from the result of the processing of step S803, and if not (step S804: NO), the processing returns to step S802. If there are characters in the candidate region (step S804: YES), in step S805, the interval s is added to a parameter representing a character appearance time related to the same candidate region that has already been stored, and the processing returns to step S802.

The determination in step S308 as to whether to change the position of the object is based on an importance parameter representing the character appearance time of each region for the analysis times 0 to t stored in step S805. The greater the value of this importance parameter, the longer is the time for which characters are output, indicating that the region is important. Note that if the character appearance time for all of the candidate regions is approximately the same, the flowchart of FIG. 3 is repeated without changing the position of the object.

In the present embodiment, as described above, the time for which characters are displayed in a region is acquired and used as the parameter. An object can thus be displayed in an appropriate position while suppressing instances where an object is superimposed on characters.

Embodiment 3

In the present embodiment, a configuration will be described in which a time for which a value showing the amount of image motion between frames is at or above a threshold is acquired and used as an importance parameter. Note that in the present embodiment, a region instructed by the user is acquired as a candidate region on which to superimpose an object. Once a superimposing region on which to superimpose an object has been determined, the object is superimposed after being transformed in accordance with the size of the superimposing region.

Since the hardware configuration and functional arrangement of the display control apparatus 100 of the present embodiment are similar to embodiment 1, description thereof will be omitted. In the present embodiment, the moving image in which an object is to be overlaid is assumed to be moving image content that has already been stored in a storage region, and does not require real-time processing, although this is not limiting.

Overall Processing

Figure 9:
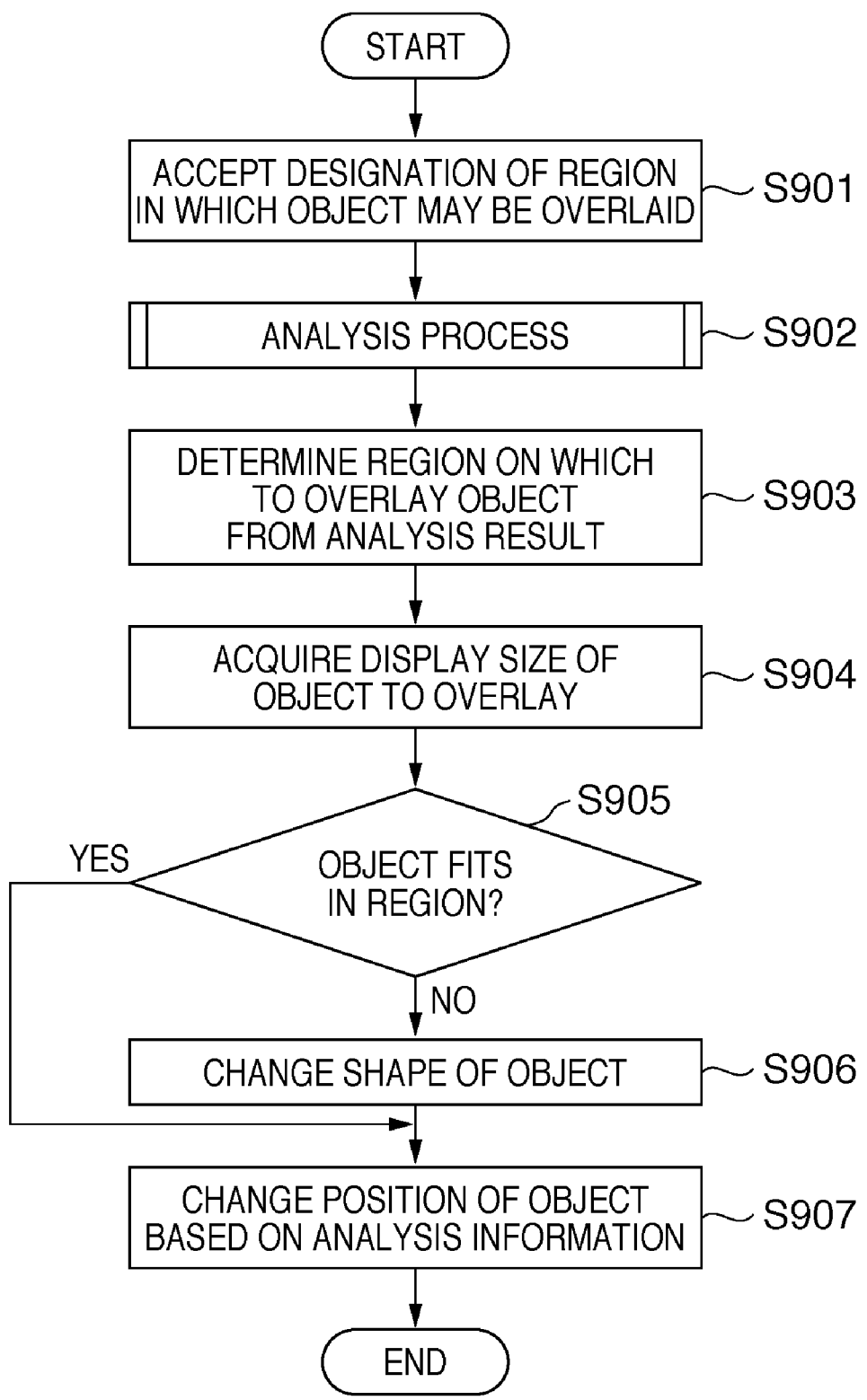
FIG. 9 is a flowchart showing the basic flow of overall processing.

The overall processing of the present embodiment will be described with reference to FIG. 9. FIG. 9 is a flowchart showing the basic flow of the overall processing.

Firstly, in step S901, designation of a candidate region in which an object may be overlaid on a moving image is accepted from the user. At least one or more designations of candidate regions are accepted. Designation of a candidate region is assumed to be performed using a pointing device such as a mouse or a touch pen, although this is not limiting.

Next, moving image analysis is performed in step S902 on the candidate regions designated in step S901. The present embodiment thus enables a region in which to display an object to be suitably set manually as necessary, since processing is performed after acquiring a region designated by the user as a candidate region. While the analysis process will be discussed in detail below, in the present embodiment, frames within a region are analyzed, and a time for which a value showing an amount of image motion between frames is at or above a threshold is acquired as an importance parameter.

Next, in step S903, the region with least effect on the display content even when an object is overlaid is determined as the superimposing region from the candidate regions designated in step S901, based on the results of the analysis performed in step S902. In the present embodiment, a region in which the time for which a value showing an amount of image motion between frames is at or above a threshold is the shortest is determined as the superimposing region. An object can thus be superimposed in an appropriate position while avoiding important portions of an image.

Next in step S904, the display size of the object to be overlaid and displayed in the superimposing region determined in step S903 is acquired.

Next, in step S905, it is determined whether the object fits with the superimposing region, by comparing the size of the superimposing region determined in step S903 with the size of the object acquired in step S904. If it is determined in step S905 that the object does not to fit (step S905: NO), in step S906 the object is transformed so as to fit in the superimposing region. The object is then overlaid and displayed on the moving image content after changing the position thereof in accordance with the position of the superimposing region determined in step S903 (S907). The process of changing the size and/or position of the object (S906, S907) is similar to the process described with reference to FIGS. 4 to 6.

According to the present embodiment, an object can thus be appropriately superimposed without important portions of the frames being hidden irrespective of the size of the object, since an object is superimposed after being transformed in accordance with the size of the determined superimposing region.

Analysis Process

Figure 10:
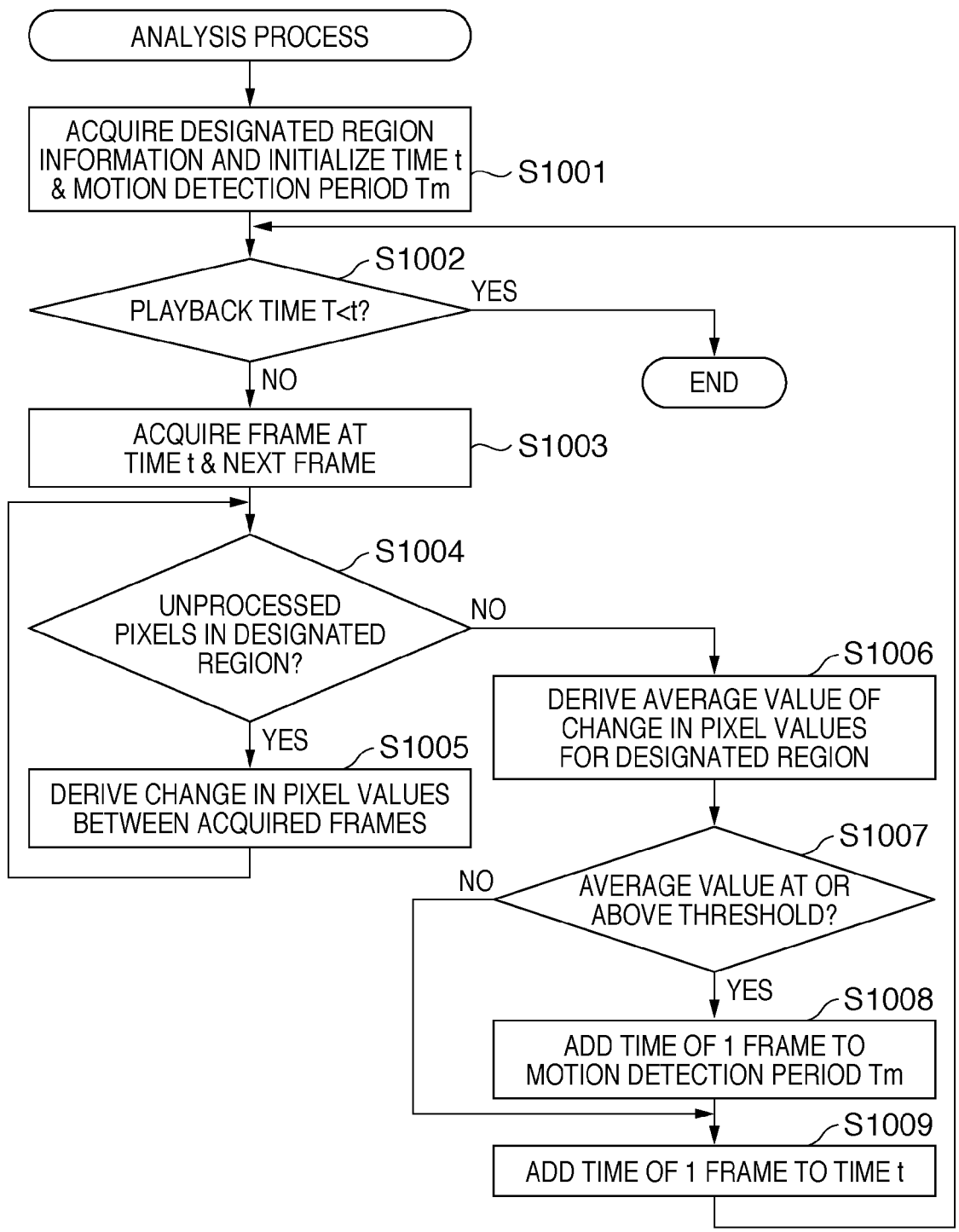
FIG. 10 is a flowchart showing an exemplary flow of an analysis process.

FIG. 10 is a flowchart showing an exemplary flow of the analysis process in step S902 of FIG. 9. Hereinafter, the exemplary analysis process will be described based on FIG. 10.

Here, the total playback time of the actual moving image content on which an object is to be overlaid is given as T, and the time per frame is given as a. Also, the pixel values constituting a frame are here constituted by 8-bit RGB information, and the upper-left coordinates, width and height of the smallest rectangle that encompasses the candidate regions designated in step S901 are given by (x, y), W, and H, respectively.

Firstly, in step S1001, the coordinates, width and height of the candidate regions designated by the user are acquired, and a time t and a motion detection period $T_m$ are initialized to 0. The motion detection period shows the length of time for which motion was detected in a designated region.

Next, it is determined in step S1002 whether the time t exceeds the total playback time T of the moving image content. If it is determined that the time t exceeds the total playback time T (step S1002: YES), the analysis process on the moving image content is ended. If it is determined that the time t does not exceed the total playback time T (step S1002: NO), frames of the moving image content at the times t and t+a are acquired at step S1003. The inter-frame change (difference) N in pixel values for the same coordinates is represented by:

$$N = \sqrt{(R-R')^2 + (G-G')^2 + (B-B')^2}$$

Note that R, G and B are the values of the RGB components of pixels at a given time, while R', G' and B' are the values of the RGB components of the same pixels in the next frame. In step S1004, it is determined whether the change (difference) in pixel values has been derived for all of the pixels in the designated candidate region, that is, whether there are any unprocessed pixels. If it is determined that there are not any unprocessed pixels (step S1004: NO), the processing moves to step S1006. If there are any unprocessed pixels (step S1004: YES), the processing moves to step S1005.

In step S1005, in the candidate region the change (difference) in pixel values between the acquired frames is derived. The processing then returns to step S1004. The processing of steps S1004 and S1005 is repeated until the change in pixel values has been derived for all of the pixels.

In step S1006, the average value of the change in pixel values is derived based on all of the derived changes (differences) in pixel values. This average value B is here used as a parameter representing the amount of change in the designated candidate region at a given time. The parameter $B_t$ representing the amount of change is given by:

$$B_t = \frac{\sum_{i=x}^{x+W} \sum_{j=y}^{y+H} N_t[i][j]}{WH}$$

where $N_t[i][j]$ is the amount of change at the coordinates (i, j) between the frames acquired in the time t.

Next, in step S1007, it is determined whether there is a significant amount of change (difference) in the designated candidate region from the time t to the time t+a using the value of $B_t$. In the present embodiment, it is determined whether the amount of change exceeds a preset threshold. If it is determined that the change is significant (step S1007: YES), the time a is added to the motion detection period $T_m$ at step S1008. If not significant (step S1007: NO), the processing moves to step S1009.

Finally, in step S1009, the time a is added to the time t, and the processing returns to step S1002.

According to the present embodiment, as described above, a region on which to superimpose an object can be appropriately determined, since the time for which a value showing the amount of image motion between frames is at or above a threshold is acquired and used as an importance parameter.

Note that the flow of FIG. 10 is performed on each candidate region designated by the user, and that this series of processes is performed for as many times as there are candidate regions designated at step S901 in FIG. 9. The region with the smallest motion detection period $T_m$ is here used as a superimposing region on which to overlay an object.

When overlaying and displaying an object in a determined superimposing region, the time for which the computed parameter B exceeds a given threshold may be stored as a motion analysis time, and this time may be used to control the display of an object. Alternatively, an object may be output so that the moving image content displayed in the background is easy to follow by changing the transparency of the object.

In the present embodiment, moving image content such as video that is already stored in a storage region and does not require real-time processing was assumed, although animation content is also acceptable.

Additional Embodiments

In the foregoing embodiments, when superimposing an object on a superimposing region, the object was transformed as necessary, although an object may be superimposed after the color thereof has been appropriately changed. For example, the color distribution of the moving image in the superimposing region may be derived, and the color of the object may be changed based on this color distribution so that the color of the object shows up. A configuration such as this enables the object to be superimposed so that it stands out no matter what the color of the frames.

The advantages of the present invention may also be achieved as follows. A storage medium (or recording medium) having recorded thereon program code of software for implementing the functions of the foregoing embodiments is supplied to a system or an apparatus. The program code stored on the storage medium is read and executed by a central operation unit (such as a CPU or a micro processing unit (MPU)) of the system or apparatus. In this case, the program code read from the storage medium implements the functions of the foregoing embodiments, and the storage medium having the program code recorded thereon constitutes an embodiment of the present invention.

Furthermore, the central operation unit of the system or apparatus may execute the read program code. This allows an operating system (OS) running on the system or apparatus to perform part of or the entirety of actual processing according to the instruction of the program code. The implementation of the functions of the foregoing embodiments by performing the processing described above may also fall within the scope of the present invention.

Storage mediums that can be used for supplying the program code include, for example, flexible disk, hard disk, optical disk, magneto-optical disk, CD-ROM, CD-R, magnetic tape, nonvolatile memory card, ROM, and DVD.

Moreover, the program code read from the storage medium may be written in a memory of a function extension board placed in the system or the apparatus or a function extension unit connected to the system or the apparatus. Thereafter, a CPU or the like of the function extension board or the function extension unit may execute part of or the entirety of actual processing according to the instruction of the program code. The implementation of the functions of the foregoing embodiments by performing the processing described above may also fall within the scope of the present invention.

According to the above described configurations, any obstruction to the viewer following what is going on in the video image can be reduced, even when an object is overlaid and displayed on a partial region of the video image.

According to an aspect of the present invention, a technique can be provided that enables an object to be superimposed in an appropriate position irrespective of the type of video image, without needing to preselect a specific object in content.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-297194, filed on Nov. 15, 2007, which is hereby incorporated by reference herein in its entirety.

What is claimed is:

1. A display control apparatus for superimposing an object on a moving image composed of a plurality of frames and outputting the moving image with the object superimposed to a monitor, comprising:
   an acquiring unit configured to acquire a plurality of candidate regions as candidates for superimposing the object on each of the plurality of frames constituting the moving image;
   an analyzing unit configured to, in each of the plurality of candidate regions acquired by the acquiring unit, analyze each of the plurality of frames and acquire a parameter showing an importance of each of the plurality of frames in each of the plurality of candidate regions;
   a determining unit configured to determine a superimposing region for superimposing the object based on the parameters; and
   a superimposing unit configured to superimpose the object on the superimposing region determined by the determining unit,
   wherein the analyzing unit is configured to acquire, as the parameter, a time for which a value showing an amount of image motion between frames is at or above a threshold, and
   wherein the determining unit is configured to determine, as the superimposing region, a region with the shortest time.

2. The display control apparatus according to claim 1, wherein the analyzing unit is configured to acquire, as the parameter, a value showing an amount of image motion between frames and estimate the amount of image motion based on a difference in pixel values between frames, and
wherein the determining unit is configured to determine, as the superimposing region, a region with the smallest amount of motion.

3. The display control apparatus according to claim 1, wherein the analyzing unit is configured to acquire, as the parameter, a display time of characters in the plurality of candidate regions, and
wherein the determining unit is configured to determine, as the superimposing region, a region with a shortest display time.

4. The display control apparatus according to claim 1, wherein the acquiring unit is configured to acquire, as the plurality of candidate regions, regions instructed by a user.

5. The display control apparatus according to claim 1, wherein the superimposing unit is configured to superimpose the object after changing a shape thereof in accordance with a size of the superimposing region determined by the determining unit.

6. The display control apparatus according to claim 1, wherein the superimposing unit superimposes the object after changing a color thereof based on a color distribution of the moving image in the superimposing region determined by the determining unit.

7. The display control apparatus according to claim 1, further comprising a receiving unit configured to receive a change signal indicating that a channel of a television broadcast has been changed,
wherein the analyzing unit is configured to acquire the parameter in response to the receiving unit receiving the change signal, and
wherein the moving image is television video.

8. The display control apparatus according to claim 1, wherein the object is represented by vector graphics.

9. A display control method of a display control apparatus for superimposing an object on a moving image composed of a plurality of frames and outputting the moving image with the object superimposed to a monitor, the display control method comprising:
   acquiring a plurality of candidate regions as candidates for superimposing the object on each of the plurality of frames constituting the moving image;
   analyzing, in each of the plurality of candidate regions acquired by the acquiring unit, each of the plurality of frames;
   acquiring a parameter showing an importance of each of the plurality of frames in each of the plurality of candidate regions;
   determining a superimposing region for superimposing the object based on the parameters; and
   superimposing the object in the superimposing region determined in the determining step.
   wherein the parameter is a time for which a value showing an amount of image motion between frames is at or above a threshold and the superimposed region is a region with the shortest time.

10. A non-transitory computer-readable storage medium storing a computer readable process, the computer readable process causing a computer to function as a display control apparatus for superimposing an object on a moving image composed of a plurality of frames and outputting the moving image to a monitor, the display control apparatus comprising:
   an acquiring unit configured to acquire a plurality of candidate regions as candidates for superimposing the object on each of the plurality of frames constituting the moving image;

an analyzing unit configured to, in each of the plurality of candidate regions acquired by the acquiring unit, analyze each of the plurality of frames and acquire a parameter showing an importance of each of the plurality of frames in each of the plurality of candidate regions;

a determining unit configured to determine a superimposing region for superimposing the object based on the parameters; and a superimposing unit configured to superimpose the object on the superimposing region determined by the determining unit, wherein the analyzing unit is configured to acquire, as the parameter, a time for which a value showing an amount of image motion between frames is at or above a threshold, and wherein the determining unit is configured to determine, as the superimposing region, a region with the shortest time.

* * * * *